United States Patent
Van Dam et al.

[11] 3,851,213
[45] Nov. 26, 1974

[54] ARRANGEMENT FOR GENERATING MODULATED ATOMIC RESONANCE

[75] Inventors: Hendrik Bessel Bart Van Dam; Zeger Van Gelder, both of Emmasingel, Netherlands

[73] Assignee: U.S. Philips Corporation, New York, N.Y.

[22] Filed: Oct. 25, 1972

[21] Appl. No.: 300,510

[30] Foreign Application Priority Data
Oct. 28, 1971  Netherlands ...................... 7114824

[52] U.S. Cl. .................. 315/174, 313/192, 313/193
[51] Int. Cl. ....................... H05b 41/00, H01j 17/00
[58] Field of Search ............. 313/192, 193; 315/174

[56] References Cited
UNITED STATES PATENTS
3,546,521  12/1970  Van Gelder ........................ 313/192
3,601,489  8/1971  Van Gelder ..................... 313/192 X

*Primary Examiner*—Herman Karl Saalbach
*Assistant Examiner*—Lawrence J. Dahl
*Attorney, Agent, or Firm*—Frank R. Trifari

[57] ABSTRACT

An arrangement for generating modulated atomic resonance radiation includes a rare-gas filled discharge vessel provided with a window passing the generated resonance radiation, two electrodes between which a positive column discharge is maintained during operation of the arrangement and at least one hollow sputtering electrode which includes the element whose resonance radiation is desired. The arrangement includes means for applying a first pulsatory voltage to the sputtering electrode and furthermore means for applying a second pulsatory voltage to the electrodes for the positive column discharge, in which the pulse repetition frequency $f$ for both pulsatory voltages is equal and has a value of between 10 and $10^4$ Hz. The product of pulses repetition frequency $f$ and pulse duration $T_1$ of the first pulsatory voltage has a value of between 0.5 and $10^{-4}$ and the second pulsatory voltage has a delay time $\tau$ relative to the first pulsatory voltage in which $0 < \tau < 2T_1$.

6 Claims, 2 Drawing Figures

ARRANGEMENT FOR GENERATING MODULATED ATOMIC RESONANCE

The invention relates to an arrangement for generating modulated atomic resonance radiation and to a device for measuring absorption and/or fluorescence of atomic resonance radiation provided with such an arrangement.

Radiation sources which emit the resonance radiation of one or more elements are frequently used in spectroscopy, particularly in atomic absorption spectroscopy and/or fluorescence spectroscopy, for the qualitative and quantitative determination of the constituents of an unknown sample. In that case, for example, a solution of the sample is sputtered in an atmospheric flame so that the solution evaporates and atoms of the sample are introduced in vapour form into the flame. If the atomic resonance radiation of a given element is passed through the flame, this radiation will be absorbed and/or reemitted to a greater or lesser extent at that area dependent on whether there is a larger or smaller quantity of atoms of said element present in the sample.

For generating atomic resonance radiation it is known to use a so-called hollow cathode discharge tube in which an electric discharge is maintained between an anode and a hollow cylindrical cathode which contains the material whose resonance radiation is desired (see, for example, U.S. Pat. No. 3,183,393).

Such an arrangement is known from French Pat. Specification No. 1,371,588 in which a positive column discharge is effected at right angles to the axis of the hollow cathode between two additional electrodes at an area where atoms are present of the material whose radiation is desired. In this manner it is possible to reach higher radiation intensities.

A discharge lamp for generating atomic resonance radiation is described in Netherlands Pat. Application No. 6,711,757 which lamp includes a discharge space filled with a rare gas and which has two electrodes between which a positive column discharge is maintained during operation. Furthermore the lamp includes a sputtering electrode in the form of a hollow cylinder which contains the element whose resonance radiation is desired. This sputtering electrode is placed coaxially about the column discharge and has a negative potential relative to the column discharge during operation. As a result of a bombardment of positive ions from the column discharge on the sputtering electrode atoms of this sputtering electrode are introduced into the column discharge where they emit inter alia their resonance radiation after they have been excited. The desired resonance radiation emerges from the lamp along the axis of the column discharge. It is possible to obtain resonance radiation of a high intensity and a very narrow line profile with this lamp.

In many cases it is desired to have a radiation source which emits modulated resonance radiation. In fact, the possibility is then created to apply selective alternating current amplification of the detected signal when using the radiation source in absorption spectroscopy and/or fluorescence spectroscopy. Such an arrangement for generating modulated atomic resonance radiation is known from the Netherlands Pat. Application No. 6,812,602. This arrangement includes a discharge lamp having a construction as described in the previously mentioned Netherlands Pat. Application No. 6,711,757 and furthermore it includes means to apply a pulsatory voltage to the sputtering electrode so that the resonance radiation is generated periodically.

If a high intensity is to be achieved in spectroscopy, a high intensity and a narrow line profile of the resonance radiation emitted by the radiation source are generally required. These requirements particularly apply to fluorescence spectroscopy. The known radiation sources, notably for fluorescence spectroscopy, often have a too low intensity. This intensity might be increased by admitting larger discharge currents in the known radiation sources. This, however, is possible to a very limited extent only because higher sputtering and column discharge currents give rise to a higher energy dissipation so that the temperature of hollow cathode or sputtering electrode may become very high. Furthermore, a high sputtering current is accompanied by a high sputtering voltage so that a more than proportional increase of the output of atoms obtained by sputtering is produced. Both phenomena result in the density of atoms becoming so high that the profile of the emitted resonance radiation is inadmissibly widened and distorted.

The object of the present invention is to provide an arrangement for generating modulated atomic resonance radiation with which higher radiation intensities may be obtained while maintaining a narrow line profile.

An arrangement for generating modulated atomic resonance radiation according to the invention includes a discharge vessel filled with rare gas and being provided with a window which passes the generated resonance radiation, two electrodes between which a positive column discharge is maintained during operation of the arrangement and at least one hollow sputtering electrode which includes the element whose resonance radiation is desired, the invention being characterized in that the arrangement includes means in a manner known per se for applying a first pulsatory voltage to the sputtering electrode, the arrangement furthermore including means for applying a second pulsatory voltage to the electrodes for the positive column discharge, the pulse repetition frequency $f$ of the second pulsatory voltage being equal to that of the first pulsatory voltage and having a value of between 10 and $10^4$ Hz, the product of pulse repetition frequency $f$ and pulse duration $T_1$ of the first pulsatory voltage having a value of between 0.5 and $10^{-4}$, and the second pulsatory voltage having a delay time $\tau$ relative to the first pulsatory voltage in which $0 < \tau < 2T_1$.

As in known arrangements, an arrangement according to the invention includes a discharge vessel in which a positive column discharge is maintained between two electrodes, and a hollow sputtering electrode which by means of ion bombardment provides the vapour of the element whose resonance radiation is desired.

In an arrangement according to the invention means are provided for applying a first pulsatory voltage to the sputtering electrode and furthermore means for applying a second pulsatory voltage to the electrodes for the positive column discharge, both pulsatory voltages having the same pulse repetition frequency $f$. The value of $f$ may be chosen within wide limits, namely between 10 and $10^4$ Hz. Values of $f$ beyond these limits are less suitable for practical purposes. By operating both the column discharge and the sputtering discharge in a pulsatory manner, it is possible to admit high instantaneous values of these currents while the total energy dissipation remains the same as in the case of direct current operation. At a given value of the energy dissipation the instantaneous value of the discharge currents may be chosen to be larger as the so-called duty cycle of the pulsatory currents is chosen to be smaller. This duty cycle is defined as the product of pulse duration T and pulse repetition frequency $f$ (or as the quotient of pulse duration T and pulse period $1/f$). In an arrangement according to the invention the duty cycle of the first pulsatory voltage is to have a value of between 0.5 and $10^{-4}$. When, for example, the value 0.1 is chosen for the duty cycle of the first pulsatory voltage, an instantaneous value of the sputtering current which is 10 times higher can be admitted for the same energy dissipation as for direct current operation. In that case the instantaneous density of atoms obtained by sputtering will be more than ten times higher than the density in case of direct current operation because of the more than proportional increase of the atom density with the sputtering current. It may then be expected that the peak height of the emitted resonance radiation pulse may be at least a factor of 10 higher than the radiation intensity in case of direct current operation. To obtain this gain in radiation intensity the column discharge current must, however, assume relatively high values. In fact, it is known that a high intensity and a narrow line profile are only possible if the ratio between the number of exciting electrons from the column discharge and the number of atoms obtained by sputtering is high (see Netherlands Pat. Application No. 6,711,757 and Appl. Spectrosc. Vol. 22, No. 5,581 (1968). To make these relatively high column discharge currents possible without obtaining inadmissibly high energy dissipation the column discharge in an arrangement according to the invention must also be operated in a pulsatory manner.

It has been surprisingly found from experiments which have led to the present invention that the above-mentioned gain in radiation intensity of the emitted resonance radiation can only be obtained if the second pulsatory voltage has a delay time $\tau$ relative to the first pulsatory voltage. In case of suitable choice of $\tau$ it is possible in an arrangement according to the invention to obtain resonance radiation pulses having a very narrow line profile and an intensity which is a factor of 100 to 200 higher than the radiation intensity obtained with the known direct-current operated arrangements. In an arrangement according to the invention $\tau$ has a value of more than zero and less than $2T_1$.

It is advantageous to have the pulse duration $T_2$ of the second pulsatory voltage to be not larger than the pulse duration $T_1$ of the first pulsatory voltage because in that case higher instantaneous values of the column discharge current can be admitted so that higher radiation intensities are obtained. The highest radiation intensities are obtained when furthermore values of the delay time $\tau$ are chosen to be less than or equal to $T_1$. An arrangement according to the invention for which $T_2 \leq T_1$ and $0 < \tau \leq T_1$ is therefore preferred.

In an arrangement according to the invention the delay time $\tau$ is preferably chosen to be higher or equal to the effective diffusion period of the atoms obtained by sputtering. Then the column discharge starts at an instant when the atom density is at a maximum. The said effective diffusion period is a function of the geometry of the discharge lamp, the nature of the sputtered atoms and the rare gas filling of the discharge vessel and is approximately equal to
$0.04 D^2/D_A$
in which D is the internal diameter of the sputtering electrode and $D_A$ is the atomic diffusion coefficient of the sputtered atoms in the relevant rare gas.

An arrangement according to the invention is preferred for which the pulse repetition frequency $f$ of the pulsatory voltages has a value of between 50 and 1,000 Hz. When using the arrangement in spectroscopy it is found that detection and processing of the signal to be measured is simplest if $f$ is chosen to be within the said range.

Optimum results are obtained with an arrangement according to the invention which includes a discharge lamp as described in Netherlands Pat. Application No. 6,711,757. In this arrangement, which is preferred, the atoms are obtained by ion bombardment on a hollow sputtering electrode. The sputtering electrode is a hollow cyclinder which encompasses the column discharge coaxially. A hollow insulating cylinder is present between sputtering electrode and window of the discharge vessel, which cylinder encompasses the column discharge coaxially and whose internal diameter is smaller than that of the sputtering electrode and whose length is at least equal to its internal diameter.

In an arrangement according to the invention it is advantageous to use a lamp as described in Netherlands Pat. Application No. 6,711,757 in which the lamp includes a plurality of sputtering electrodes $1, 2, \ldots n$, respectively which are all located on the same axis and are separated by hollow insulating cylinders. The arrangement is provided with means to apply alternately one or more voltage pulses of pulse duration $T_{11}, T_{12}, \ldots T_{1n}$ to the sputtering electrodes $1, 2, \ldots n$, respectively, and furthermore means for applying voltage pulses to the electrodes of the positive column discharge, which pulses as compared with the pulses applied to the sputtering electrodes $1, 2, \ldots n$ have a delay time of $\tau_1, \tau_2, \ldots \tau_n$, respectively, while for each $\tau_n$ there applies that $0 < \tau_n < 2 T_{1n}$. In absorption spectroscopy and/or fluorescence spectroscopy this arrangement provides the possibility of determining the contents of different elements in a sample without having to exchange a radiation source.

An arrangement according to the invention is preferably used in a device for measuring absorption and/or fluorescence of atomic resonance radiation, particularly for determining traces of elements in a sample. This device furthermore includes means for detecting radiation passed and/or re-emitted by the sample. These means include, for example, a radiation sensitive element which converts the measured radiation into an electrical signal measured by a pulse height detector.

Special advantages are obtained if in such a device an arrangement according to the invention having a plurality of sputtering electrodes is used. The means for detecting the radiation passed and/or re-emitted by the sample then include a photo-sensitive detector and a gating circuit for each sputtering electrode to which the output signal from the photo-sensitive detector is applied and which gating circuit is operated by the pulses to be applied to the sputtering electrodes. In that case, for example, the $n^{th}$ gating circuit is opened so that the signal originating from the $n^{th}$ sputtering electrode is passed at an instant $\tau_n$ sec. after the commencement of the sputtering voltage pulse on the $n^{th}$ sputtering electrode. With this arrangement it is possible to determine the contents of different elements in a sample simultaneously and independently of each other.

In order that the invention may be readily carried into effect it will now be described in detail by way of example with reference to a plurality of measurements and the accompanying diagrammatic drawing in which.

Figure 1:
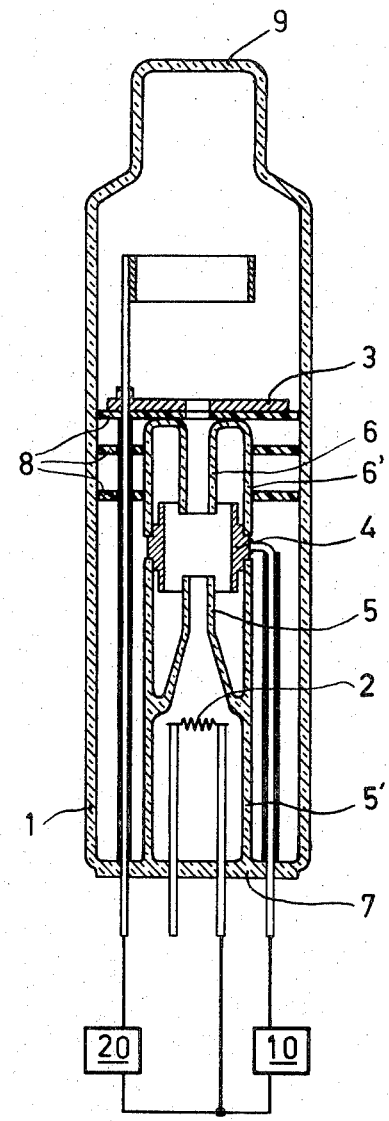
FIG. 1 shows an embodiment of an arrangement according to the invention.

In FIG. 1 the reference numeral 1 denotes the envelopes, for example, of glass of a discharge vessel in which a column discharge can take place between the cathode 2 and an anode 3. The discharge vessel is filled with argon up to a pressure of 1 Torr. A cylindrical copper sputtering electrode 4 which has an internal diameter of 12.5 mms is arranged about the column discharge. Glass cylinders 5 and 6 are provided on both sides of the sputtering electrode 4. Cylinder 5 is surrounded by and constitute an assembly with the glass cylinder 5' which is sealed to the bottom 7 of the discharge vessel. The cylinder 6 is coaxially surrounded by the glass cylinder 6' and constitutes an assembly therewith. The outer surface of the sputtering 4 is provided with a step-shaped protruding edge on which cylinder 6' bears and which edge is supported by cylinder 5'. Mica plates 8 serve for centring and furthermore for improving the insulation so that unwanted discharges are prevented. The copper radiation generated in the discharge vessel emerges along the axis of the column discharge through a quartz glass window 9 in the envelope 1.

The arrangement of FIG. 1 furthermore includes a pulse generator 10 which supplies a pulsatory negative voltage at a pulse repetition frequency of 100 Hz and a duty cycle of 0.1 to the sputtering electrode 4. A pulsatory voltage having a pulse repetition frequency of 100 Hz and a duty cycle of 0.05 is applied by pulse generator 20 to the electrodes 2 and 3 for the positive column discharge. The column pulses have a delay time $\tau$ of approximately 500 /μsec relative to the sputtering pulses. For a value of the column discharge pulses of 1,000 mA and of the sputtering discharge pulses of 50 mA the peak height of the emitted copper radiation measured on a photo-cell is 1,900 mV. If this arrangement is operated with a direct voltages, the copper radiation intensity at a column current of 100 mA and a sputtering current of 10 mA is only 10 mV.

Measurements on arrangements equal to the arrangement described above but in which the copper sputtering electrodes are replaced by sputtering electrodes of iron, aluminium and nickel, respectively, are summarized in the Tables I, II and III below. In all cases the internal diameter of the sputtering electrodes is 12.5 mms and the rare gas filling consists of argon at a pressure of 1 Torr. The pulse repetition frequency of the pulsatory voltages is always 100 Hz. The tables state the values of the duty cycle of the sputtering discharge current ($i_s$) and of the column discharge current ($i_z$) and the pulse height of these currents $i_s$ and $i_z$ in mA. Furthermore the tables state the magnitude of the delay time $\tau$ in /μsec. The emitted atomic resonance radiation is measured with a photo-electric detector. The peak height (in mV) of the output signal from this detector is a measure of the intensity (I) of the emitted radiation. For the purpose of comparison each measurement states the radiation intensity I in mV which is obtained if no delay time is used ($\tau = 0$). In the case of an arrangement for generating iron resonance radiation the result of the measurement upon direct current operation (DC) is also included for the purpose of comparison.

Table I

Arrangement for generating iron resonance radiation

| duty cycle | | $i_s$ in mA | $i_z$ in mA | $\tau$ in μ sec | I in mV |
|---|---|---|---|---|---|
| $i_s$ | $i_z$ | | | | |
| DC | DC | 10 | 100 | — | 10 |
| 0.1 | 0.1 | 100 | 1000 | 0 | 20 |
| 0.1 | 0.1 | 100 | 1000 | 800 | 400 |
| 0.1 | 0.05 | 100 | 2000 | 0 | 30 |
| 0.1 | 0.05 | 100 | 2000 | 800 | 450 |

Table II

Arrangement for generating aluminium resonance radiation

| duty cycle | | $i_s$ in mA | $i_z$ in mA | $\tau$ in μ sec | I in mV |
|---|---|---|---|---|---|
| $i_s$ | $i_z$ | | | | |
| 0.1 | 0.1 | 25 | 100 | 0 | 65 |
| 0.1 | 0.1 | 25 | 100 | 640 | 600 |
| 0.1 | 0.1 | 25 | 250 | 0 | 50 |
| 0.1 | 0.1 | 25 | 250 | 640 | 600 |
| 0.1 | 0.1 | 25 | 500 | 0 | 8 |
| 0.1 | 0.1 | 25 | 500 | 640 | 700 |
| 0.1 | 0.05 | 25 | 500 | 0 | 10 |
| 0.1 | 0.05 | 25 | 500 | 550 | 560 |
| 0.1 | 0.025 | 25 | 1000 | 0 | 15 |
| 0.1 | 0.025 | 25 | 1000 | 630 | 700 |
| 0.1 | 0.0125 | 25 | 2000 | 0 | 15 |
| 0.1 | 0.0125 | 25 | 2000 | 630 | 760 |

Table III

Arrangement for generating nickel resonance radiation

| duty cycle | | $i_s$ in mA | $i_z$ in mA | $\tau$ in μ sec | I in mV |
|---|---|---|---|---|---|
| $i_s$ | $i_z$ | | | | |
| 0.1 | 0.1 | 50 | 500 | 0 | 50 |
| 0.1 | 0.1 | 50 | 500 | 600–1000 | 175 |
| 0.1 | 0.05 | 50 | 1000 | 0 | 8 |
| 0.1 | 0.05 | 50 | 1000 | 600–1000 | 225 |
| 0.1 | 0.025 | 50 | 2000 | 0 | 7 |
| 0.1 | 0.025 | 50 | 2000 | 600–1000 | 260 |
| 0.05 | 0.05 | 100 | 1000 | 0 | 100 |
| 0.05 | 0.05 | 100 | 1000 | 600–1000 | 500 |
| 0.05 | 0.025 | 100 | 2000 | 0 | 20 |
| 0.05 | 0.025 | 100 | 2000 | 600–1000 | 640 |

Figure 2:
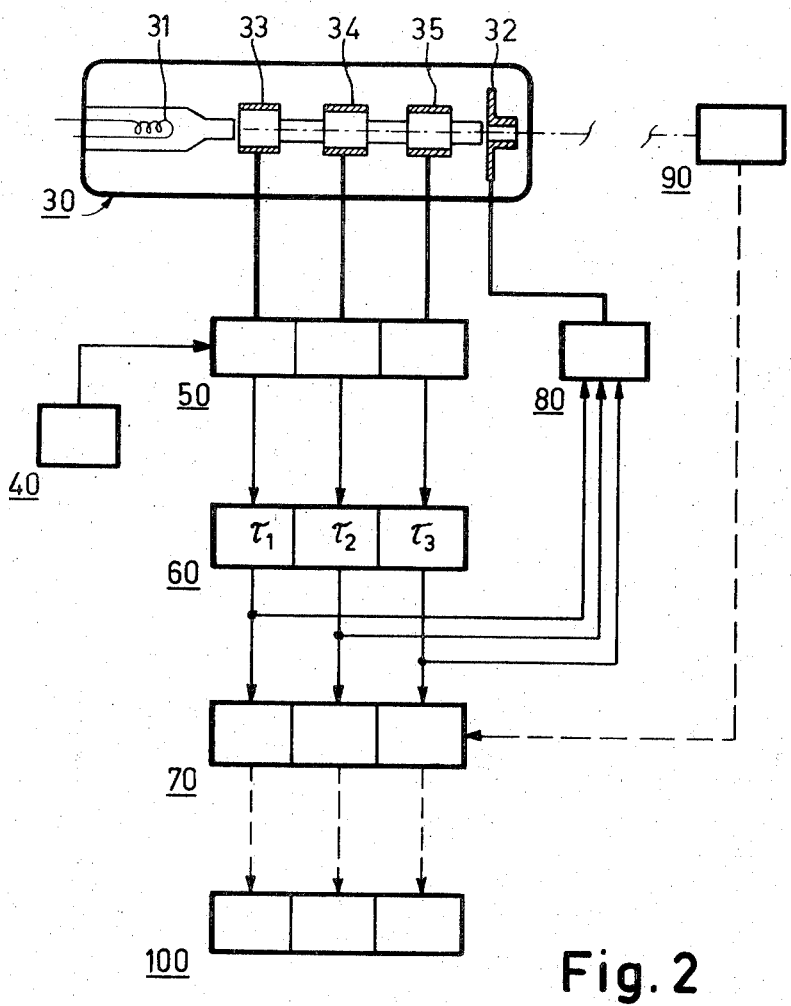
FIG. 2 shows a principle circuit diagram for a device for measuring absorption and/or fluorescence of atomic resonance radiation according to the invention, provided with an arrangement according to the invention which includes three sputtering electrodes.

FIG. 2 shows the principle circuit diagram of a device according to the invention for measuring absorption and/or fluorescence of atomic resonance radiation. The device includes a discharge lamp 30 which is provided with three sputtering electrodes 33, 34 and 35, for example, of copper, iron and nickel, respectively. All sputtering electrodes encompass the discharge path of the positive column discharge between cathode 31 and anode 32. Furthermore, the device includes a pulse generator 40 which supplies control pulses to a control unit 50. This control unit 50 applies alternately one or more voltage pulses to the sputtering electrodes 33, 34 and 35 and synchronously with these voltage pulses control pulses to a delay unit 60. The delay unit 60 passes the last-mentioned control pulses at a delay time $\tau_1$, $\tau_2$ and $\tau_3$ to a gating circuit 70 and also to a control unit 80. The control unit 80 supplies voltage pulses synchronously with the applied (delayed) control pulses to anode 32. The column voltage is thus always initiated at instants $\tau_1$, $\tau_2$ and $\tau_3$ after the sputtering voltage pulses on the electrodes 33, 34 and 35, respectively, are initiated. The atomic resonance radiation emitted by the lamp is detected by a photo-sensitive cell 90 which converts the radiation pulses into voltage pulses. These voltage pulses, which are a measure of the intensity of the emitted atomic resonance radiation, are applied through the gating circuit 70 to a pulse height meter 100 so that the radiation pulses emitted by atoms originating from the electrodes 33, 34 and 35 are measured separately.

What is claimed is:

1. Apparatus for generating modulated atomic resonance radiation, comprising:
    an enclosure filled with rare gas and having a window through which generated resonance radiation may pass;
    a cathode and an anode inside said enclosure between which a positive column discharge may be established;
    a sputtering electrode inside said enclosure containing the material of which modulated atomic resonance radiation is desired, said sputtering electrode being positioned to sputter said material between said cathode and anode where a positive column discharge may be established;
    first periodic pulse generating means connected to said sputtering electrode for applying pulses thereto at a pulse repetition rate of between 10 and $10^4$ pulses per second and a duty cycle of between 0.5 and $10^{-4}$;
    second periodic pulse generating means connected between said cathode and anode for establishing a pulsatory positive column discharge therebetween having a pulse repetition rate equal to the pulse repetition rate of said first periodic pulse generating means, the pulses of said second pulse generating means being time delayed with respect to the pulses from said first pulse generating means, said time delay being less than twice the pulse duration of the pulses of said first pulse generating means.

2. Apparatus as defined in claim 1 wherein the pulse duration of the pulses of said second pulse generating means is less than or equal to the pulse duration of the pulses of said first pulse generating means and said time delay is less than the pulse duration of the pulses of said first pulse generating means.

3. Apparatus as defined in claim 1 wherein said sputtering electrode has the form of a hollow cylinder coaxially surrounding the positive column discharge and having an internal diameter D and said time delay is equal to or greater than $0.04D^2/D_A$ where $D_A$ is the atomic diffusion coefficient of the atomic vapor provided by said sputtering electrode.

4. Apparatus as defined in claim 1 wherein the pulse repetition rate of said first pulse generating means is between 50 and 1,000 pulses per second.

5. Apparatus as defined in claim 1 wherein the axis of the positive column discharge intersects the window of said enclosure, said sputtering electrode having the form of a hollow cylinder coaxially surrounding the positive column discharge and further comprising a hollow insulating cylinder coaxially surrounding the positive column discharge and positioned between said sputtering electrode and the window of said enclosure, the internal diameter of said hollow insulating cylinder being smaller than the internal diameter of said sputtering electrode and the length thereof being equal to or exceeding its diameter.

6. Apparatus as claimed in claim 5, characterized in that said enclosure includes a plurality of sputtering electrodes 1, 2, . . . . n, all being located on the same axis and being separated by hollow insulating cylinders, and further including means for applying alternately one or more voltage pulses of pulse duration $T_{11}$, $T_{12}$ . . . $T_{1n}$ to the sputtering electrodes 1, 2, . . . n, respectively, and means for applying voltage pulses between said cathode and anode which pulses relative to the pulses applied to the sputtering electrodes 1, 2, . . . n have a delay time $\tau_1, \tau_2, \ldots \tau_n$ in which for each $\tau_n$, $0 < \tau_n < 2T_{1n}$.

* * * * *

UNITED STATES PATENT AND TRADEMARK OFFICE
CERTIFICATE OF CORRECTION

PATENT NO. : 3,851,213
DATED : November 26, 1974
INVENTOR(S) : BART BESSEL HENDRIK VAN DAM ET AL It is certified that error appears in the above–identified patent and that said Letters Patent are hereby corrected as shown below:

In the Title Page, Section [57], line 15, "pulses" should be --pulse--;

Col. 5, line 18, "lopes" should be --lope--.

Signed and Sealed this

Twenty-eighth Day of December 1976

[SEAL]

Attest:

RUTH C. MASON
*Attesting Officer*

C. MARSHALL DANN
*Commissioner of Patents and Trademarks*